(12) United States Patent
Chasen et al.

(10) Patent No.: US 7,549,127 B2
(45) Date of Patent: Jun. 16, 2009

(54) METHOD AND APPARATUS FOR RESIZING VIDEO CONTENT DISPLAYED WITHIN A GRAPHICAL USER INTERFACE

(75) Inventors: Jeffrey Martin Chasen, Bellevue, WA (US); Kenneth B. Moore, Seattle, WA (US); Peter J. Bradley, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 780 days.

(21) Appl. No.: 10/211,990

(22) Filed: Aug. 1, 2002

(65) Prior Publication Data

US 2004/0025112 A1 Feb. 5, 2004

(51) Int. Cl.
*G06F 3/048* (2006.01)
*G06F 3/00* (2006.01)

(52) U.S. Cl. .................. 715/788; 715/799; 715/800; 715/815

(58) Field of Classification Search ............... 84/609; 715/719, 726, 500.1, 768, 788, 792, 798, 715/800, 802, 799, 815; 345/629, 661
See application file for complete search history.

(56) References Cited

U.S. PATENT DOCUMENTS

| | | | | |
|---|---|---|---|---|
| 5,386,505 A | * | 1/1995 | Beattie et al. | 715/790 |
| 5,396,590 A | * | 3/1995 | Kreegar | 715/808 |
| 5,404,316 A | * | 4/1995 | Klingler et al. | 715/723 |
| 5,442,744 A | * | 8/1995 | Piech et al. | 715/500.1 |
| 5,473,740 A | * | 12/1995 | Kasson | 345/628 |
| 5,513,306 A | * | 4/1996 | Mills et al. | 715/530 |
| 5,579,462 A | * | 11/1996 | Barber et al. | 345/440 |
| 5,581,670 A | * | 12/1996 | Bier et al. | 715/856 |
| 5,596,346 A | * | 1/1997 | Leone et al. | 345/667 |
| 5,617,114 A | * | 4/1997 | Bier et al. | 345/634 |
| 5,619,636 A | * | 4/1997 | Sweat et al. | 715/500.1 |

(Continued)

FOREIGN PATENT DOCUMENTS

EP 0523771 A1 * 1/1993

(Continued)

OTHER PUBLICATIONS

Microsoft.com et al. "General information about microsoft photo editor" Mar. 2001.*

(Continued)

*Primary Examiner*—Weilun Lo
*Assistant Examiner*—Steven B. Theriault
(74) *Attorney, Agent, or Firm*—Adam L. K. Philipp; Axios Law Group, PLLC.

(57) ABSTRACT

In one embodiment, video content is rendered within a windowpane displayed upon graphical user interface (GUI), a curser is positioned within the GUI responsive to user input, and a graphical resizing overlay is superimposed over the windowpane to facilitate arbitrary resizing of the windowpane and corresponding video content by the user when the cursor is positioned over the windowpane. In another aspect of the invention, an application window including at least a first windowpane and a second windowpane is displayed within a GUI, video content having a first display size is rendered within the first windowpane, the first windowpane and the corresponding video content is resized by a first amount resulting in a second display size, and the second windowpane is dynamically resized by a second amount proportional to the first amount such that the video content remains unobstructed by the first and second windowpanes and the application window.

51 Claims, 13 Drawing Sheets

U.S. PATENT DOCUMENTS

| | | | | |
|---|---|---|---|---|
| 5,682,326 | A * | 10/1997 | Klingler et al. | 715/500.1 |
| 5,729,704 | A * | 3/1998 | Stone et al. | 715/804 |
| 5,732,230 | A * | 3/1998 | Cullen et al. | 715/764 |
| 5,748,174 | A * | 5/1998 | Wong et al. | 715/798 |
| 5,751,283 | A * | 5/1998 | Smith | 715/798 |
| 5,760,772 | A * | 6/1998 | Austin | 715/798 |
| 5,760,785 | A * | 6/1998 | Barber et al. | 345/440 |
| 5,768,491 | A * | 6/1998 | Lobodzinski et al. | 345/620 |
| 5,771,042 | A * | 6/1998 | Santos-Gomez | 715/800 |
| 5,796,402 | A * | 8/1998 | Ellison-Taylor | 715/792 |
| 5,798,752 | A * | 8/1998 | Buxton et al. | 715/863 |
| 5,831,615 | A * | 11/1998 | Drews et al. | 715/768 |
| 5,847,706 | A * | 12/1998 | Kingsley | 715/788 |
| 5,864,868 | A * | 1/1999 | Contois | 707/104.1 |
| 5,995,095 | A * | 11/1999 | Ratakonda | 715/500.1 |
| 6,008,809 | A * | 12/1999 | Brooks | 715/792 |
| 6,023,275 | A * | 2/2000 | Horvitz et al. | 715/700 |
| 6,026,409 | A * | 2/2000 | Blumenthal | 707/104.1 |
| 6,166,736 | A * | 12/2000 | Hugh | 715/798 |
| 6,173,317 | B1 * | 1/2001 | Chaddha et al. | 709/219 |
| 6,191,800 | B1 * | 2/2001 | Arenburg et al. | 345/505 |
| 6,195,094 | B1 | 2/2001 | Celebiler | |
| 6,248,946 | B1 * | 6/2001 | Dwek | 84/609 |
| 6,252,595 | B1 * | 6/2001 | Birmingham et al. | 715/803 |
| 6,262,723 | B1 * | 7/2001 | Matsuzawa et al. | 715/723 |
| 6,262,724 | B1 * | 7/2001 | Crow et al. | 715/723 |
| 6,304,271 | B1 * | 10/2001 | Nehme | 345/620 |
| 6,310,631 | B1 * | 10/2001 | Cecco et al. | 715/792 |
| 6,323,878 | B1 * | 11/2001 | Haffey et al. | 345/660 |
| 6,353,450 | B1 * | 3/2002 | DeLeeuw | 715/768 |
| 6,377,282 | B1 * | 4/2002 | Champion | 715/726 |
| 6,396,487 | B1 | 5/2002 | Jameson | |
| 6,396,962 | B1 * | 5/2002 | Haffey et al. | 382/298 |
| 6,449,653 | B2 * | 9/2002 | Klemets et al. | 709/231 |
| 6,452,609 | B1 * | 9/2002 | Katinsky et al. | 715/716 |
| 6,456,745 | B1 * | 9/2002 | Bruton et al. | 382/298 |
| 6,473,102 | B1 | 10/2002 | Rodden et al. | |
| 6,570,585 | B1 * | 5/2003 | Hines et al. | 715/716 |
| 6,587,128 | B2 * | 7/2003 | Kanevsky et al. | 715/768 |
| 6,597,375 | B1 * | 7/2003 | Yawitz | 715/723 |
| 6,614,152 | B1 * | 9/2003 | Berton et al. | 313/402 |
| 6,628,303 | B1 * | 9/2003 | Foreman et al. | 715/723 |
| 6,633,310 | B1 * | 10/2003 | Andrew et al. | 715/728 |
| 6,654,025 | B1 * | 11/2003 | Kaczowka | 345/592 |
| 6,677,964 | B1 * | 1/2004 | Nason et al. | 715/764 |
| 6,714,215 | B1 * | 3/2004 | Flora et al. | 715/716 |
| 6,731,285 | B2 * | 5/2004 | Matchen | 345/428 |
| 6,738,081 | B2 * | 5/2004 | Gupta et al. | 715/767 |
| 6,832,355 | B1 * | 12/2004 | Duperrouzel et al. | 715/788 |
| 6,839,744 | B1 * | 1/2005 | Kloba et al. | 709/219 |
| 6,873,341 | B1 * | 3/2005 | Adams et al. | 345/629 |
| 7,064,772 | B1 * | 6/2006 | Thompson et al. | 345/661 |
| 7,084,886 | B2 * | 8/2006 | Jetha et al. | 345/620 |
| 7,213,214 | B2 * | 5/2007 | Baar et al. | 715/801 |
| 2001/0033296 | A1 * | 10/2001 | Fullerton et al. | 345/730 |
| 2002/0059602 | A1 * | 5/2002 | Macrae et al. | 725/42 |
| 2002/0078144 | A1 * | 6/2002 | Lamkin et al. | 709/203 |
| 2002/0089530 | A1 * | 7/2002 | Markel | 345/719 |
| 2002/0093516 | A1 * | 7/2002 | Brunner et al. | 345/629 |
| 2002/0097984 | A1 * | 7/2002 | Abecassis | 386/70 |
| 2002/0118299 | A1 * | 8/2002 | Kahn | 348/569 |
| 2002/0188628 | A1 * | 12/2002 | Cooper et al. | 707/500.1 |
| 2002/0191028 | A1 * | 12/2002 | Senechalle et al. | 345/800 |
| 2003/0028892 | A1 * | 2/2003 | Gewickey et al. | 725/110 |
| 2003/0068161 | A1 * | 4/2003 | Lasorsa et al. | 386/111 |
| 2003/0090482 | A1 * | 5/2003 | Rousso et al. | 345/419 |
| 2003/0145338 | A1 * | 7/2003 | Harrington | 725/136 |
| 2004/0046778 | A1 * | 3/2004 | Niranjan et al. | 345/716 |
| 2004/0109014 | A1 * | 6/2004 | Henderson | 345/716 |
| 2004/0125121 | A1 * | 7/2004 | Pea et al. | 345/716 |
| 2005/0055645 | A1 * | 3/2005 | Matthews et al. | 715/800 |
| 2005/0060759 | A1 * | 3/2005 | Rowe et al. | 725/143 |
| 2005/0073528 | A1 * | 4/2005 | Gu | 345/589 |
| 2005/0188310 | A1 * | 8/2005 | Dideriksen et al. | 715/728 |
| 2005/0195154 | A1 * | 9/2005 | Robbins et al. | 345/156 |
| 2005/0197763 | A1 * | 9/2005 | Robbins et al. | 701/200 |

OTHER PUBLICATIONS

Apple Inc. et al. "Handling Carbon Windows and Controls" Apr. 2002—See document revision history—which includes annotation of having Overlay Windows.*

Apple Inc. et al. "Using Overlay Windows" Apr. 2002.*

* cited by examiner

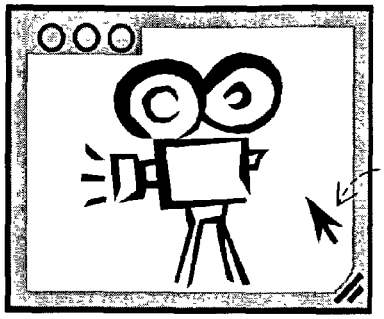
FIGURE 9A
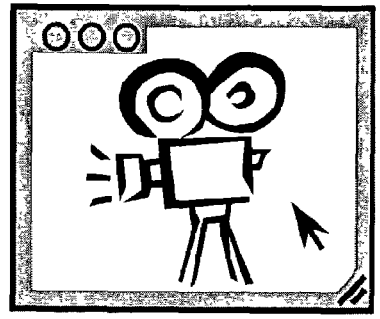
FIGURE 9B
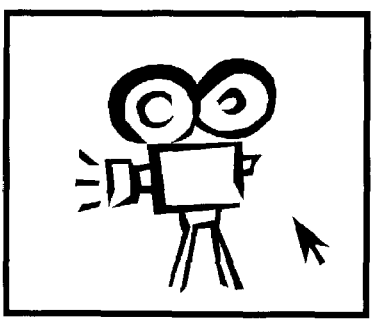
FIGURE 9C
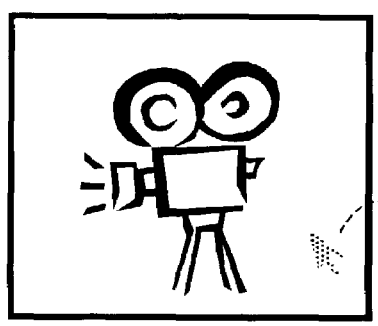
FIGURE 9D
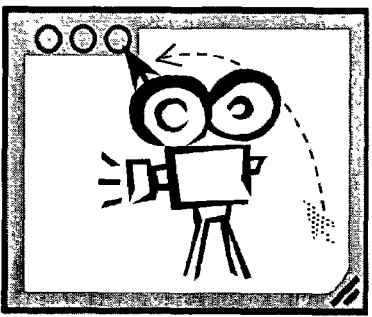
FIGURE 9E
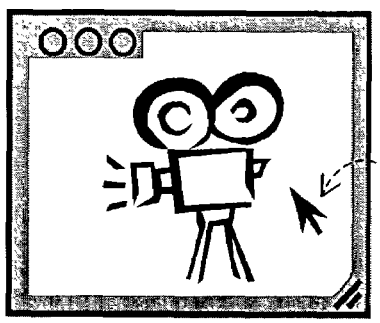
FIGURE 9F
FIGURE 9

METHOD AND APPARATUS FOR RESIZING VIDEO CONTENT DISPLAYED WITHIN A GRAPHICAL USER INTERFACE

BACKGROUND OF THE INVENTION

1. Field of the Invention

The present invention relates generally to the field of computing. More specifically, the present invention relates to the resizing of video content within a graphical user interface.

2. Background Information

With advances in integrated circuit, microprocessor, networking and communication technologies, an increasing number of devices, in particular, digital computing devices, are being networked together. Accordingly, content providers who in the past relied on conventional broadcast mediums such as radio and television for media distribution have begun to distribute large amounts of media electronically over the Internet. Whether the media is provided as a file to be downloaded and subsequently rendered through what is referred to as a "viewer" or "player", or the media is provided as a stream (i.e. where the media begins to be rendered before the entire media clip is retrieved) for near real-time rendering through a player, content providers and player designers are continually trying to improve the user experience associated with digital media distribution and rendering. To that end, although existing players currently provide a rich mix of features to enhance the user experience, additional improvements and features are desirable.

More specifically, existing players limit the ways in which users are able to manipulate the rendered media. For example, in order to resize rendered video content, a user is currently limited to either selecting a predefined percentage to which the image will be scaled (e.g. 50%, 100%, 200% full screen), or resizing the entire player application window containing the rendered video. Unfortunately however, the predefined image sizes do not always provide adequate resizing options or the level of granularity desired by the user, and resizing the entire player application window often results in either the rendered video being obstructed by e.g. the application window, or a large portion of the GUI ending up being devoted to the player application window rather than the video content.

BRIEF DESCRIPTION OF DRAWINGS

The present invention will be described by way of exemplary embodiments, but not limitations, illustrated in the accompanying drawings in which like references denote similar elements, and in which:

FIG. 9 shows various windowpane instances illustrating various conditions for the superimposition and corresponding removal of resizing overlay 704 in accordance with one embodiment as described with respect to FIG. 8;

DETAILED DESCRIPTION OF EMBODIMENTS OF THE INVENTION

The present invention describes a method and apparatus for resizing video content displayed within a graphical user interface. In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as receiving, determining, rendering, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
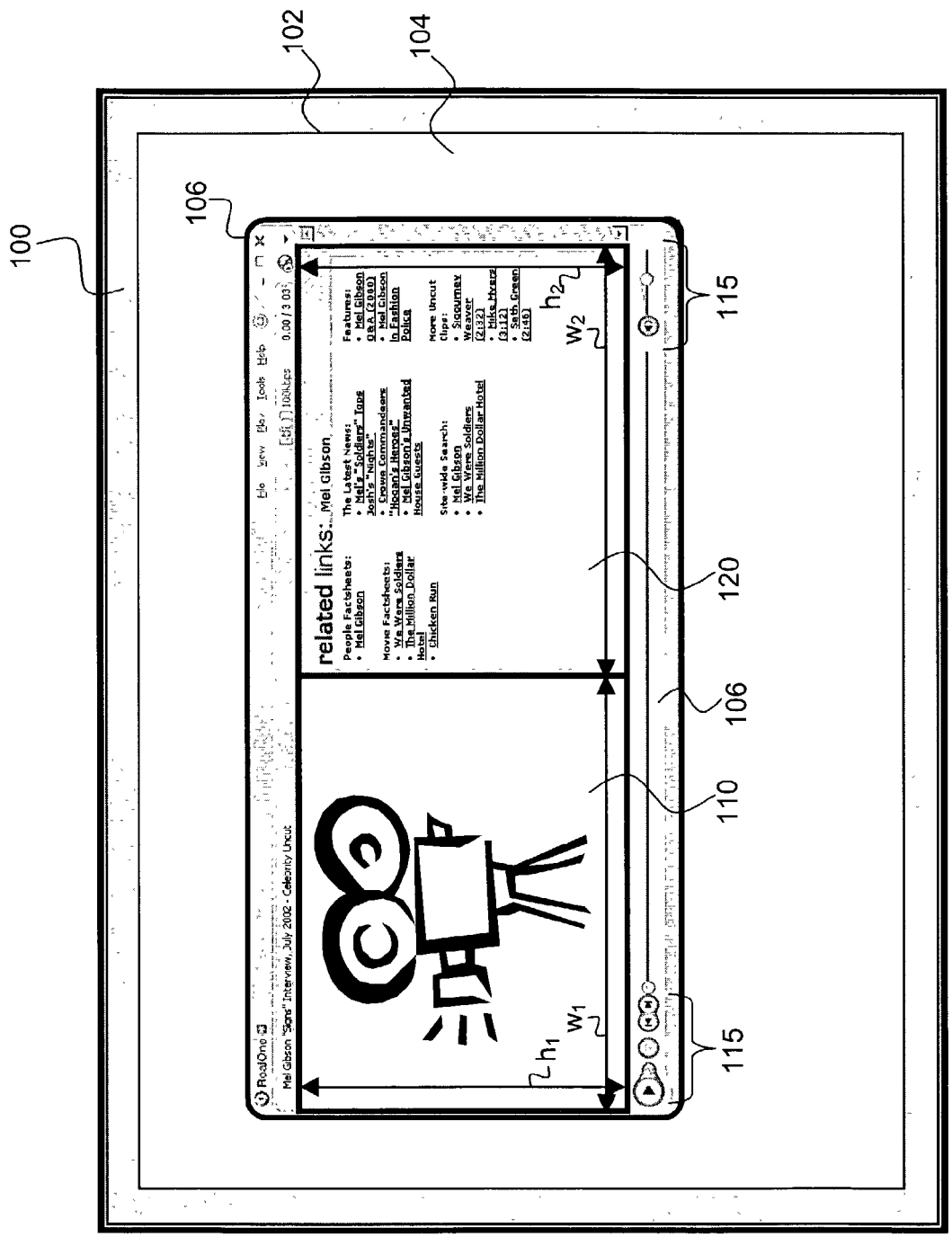
FIG. 1 illustrates an overview of the present invention in accordance with one embodiment.

FIG. 1 illustrates an overview of the present invention in accordance with one embodiment. As illustrated, graphical user interface (GUI) 102 of display device 100 includes shared application display area or "desktop" 104 and application window 106 displayed upon desktop 104. In accordance with one embodiment of the invention, application window 106 represents graphical output resulting from a "windowpane-enabled application" executing e.g. on a processor of a processor based computing device communicatively coupled to display device 100. The term "processor" includes microprocessors, micro-controllers, digital signal processors, and the like, that are standalone, adjunct or embedded. Further, the term "processor based computing device" (hereinafter, simply computing device) includes but is not limited to wireless mobile phones, palm sized personal digital assistants, notebook computers, desktop computers, set-top boxes, game consoles, servers, and so forth. A "windowpane-enabled" or "pane-enabled" application, refers to a class of applications incorporated with the teachings of the present invention, whose graphical display output includes an application window having two or more separately and multi-dimensionally resizable windowpanes contained within the application window itself. The term application window is intended to refer to a container window generated by an executing application that encloses or surrounds two or more individually resizable windowpanes and is itself movable and resizable using standard GUI calls. Unlike an application window, the windowpanes contained therein are not independently movable within desktop 104, however, movement of the application window (by e.g. a user) will cause corresponding and coordinated movement in the windowpanes contained therein.

As illustrated, application window 106 includes a first windowpane 110 having a height ($h_1$) and a width ($w_1$), and a second windowpane 120 having a height ($h_2$) and a width ($w_2$). In accordance with one embodiment of the invention, as height $h_1$ of windowpane 110 increases/decreases, height $h_2$ of windowpane 120 increases/decreases proportionally, and vice-versa. Similarly, width $w_1$ of windowpane 110 increases/decreases, width $w_2$ of windowpane 120 adjusts inversely proportional to windowpane 110, and vice-versa. Although the height and/or width of a windowpane can be increased/decreased, the content displayed therein need not increase/decrease proportionally with the windowpane. In one embodiment, as either or both windowpanes 110 and 120 are resized, the size (i.e. desktop footprint) of application window 106 remains constant. Conversely, in one embodiment if application window 106 is resized, windowpanes 110 and 120 are correspondingly resized by an amount proportional to the amount with which application window 106 was resized. In one embodiment, when either or both of windowpanes 110 and 120 are resized, their respective aspect ratios remain constant (e.g. each pane's height to width ratio remains constant with respect to itself). In one embodiment, if application window 106 is resized, windowpanes 110 and 120 are correspondingly resized such that the content rendered in at least one of windowpanes 110 and 120 remains unobstructed by e.g. application window 106 or any part thereof. The term rendering refers broadly to the process of generating human perceptible audio and/or video from digital data. Rendering may include decoding encoded data and outputting the decoded data to an output device such as a monitor or speaker, however, the data need not necessarily be encoded/decoded.

In the illustrated embodiment, application window 106 represents output generated by an executing multi-media content player for rendering both static and streaming audio and video data. In the illustrated embodiment, windowpane 110 contains video content rendered by the executing multi-media content player, whereas windowpane 120 displays contextual information associated with the content rendered within windowpane 110. Additionally player controls 115 are provided to facilitate user control of the multi-media content player. For ease of understanding of the invention, various examples and embodiments of the present invention are described herein using such a multi-media player paradigm illustrated in FIG. 1. It should be noted, however that the present invention need not necessarily be limited to such multi-media applications and/or content rendering.

Figure 2:
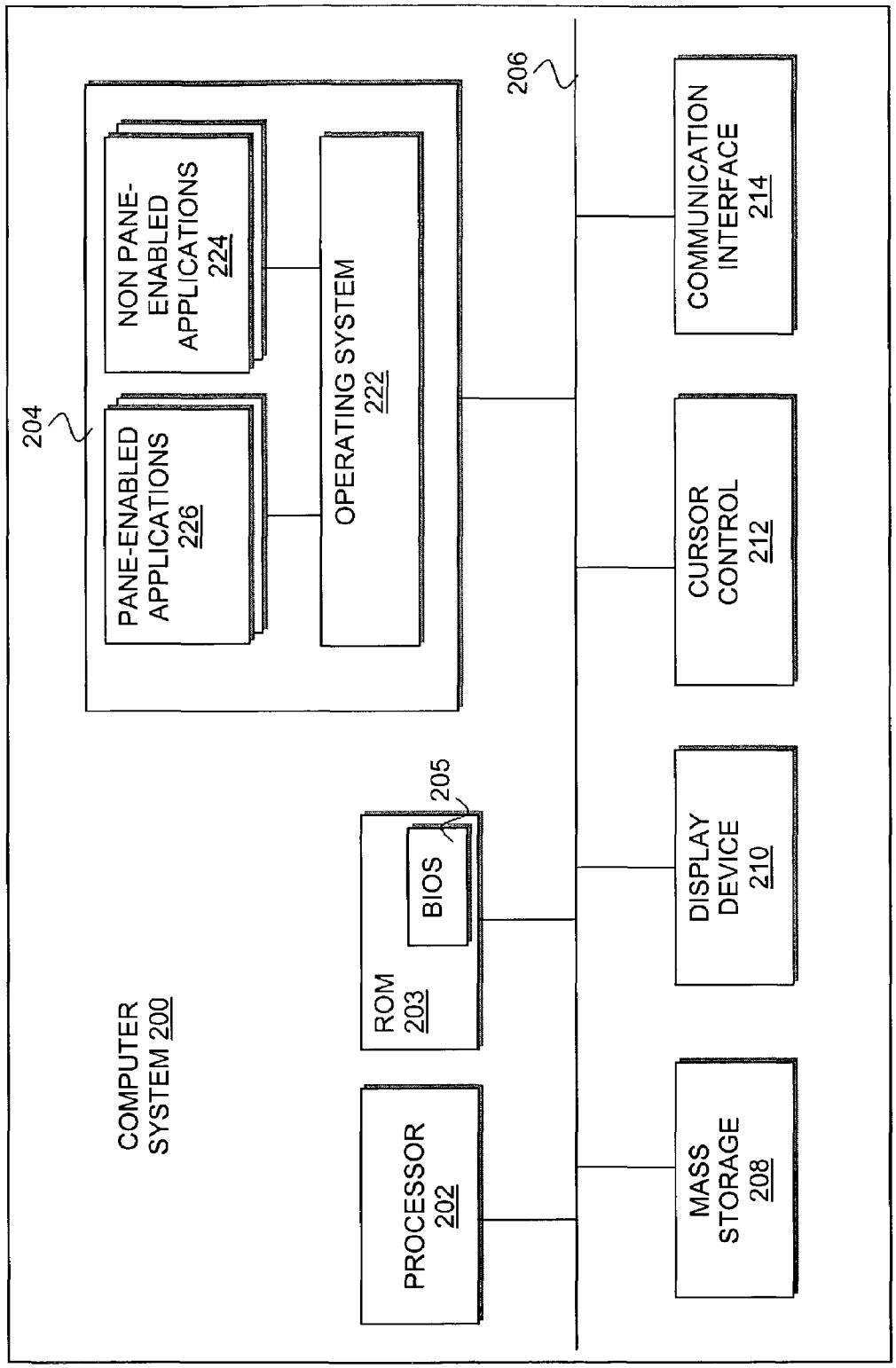
FIG. 2 illustrates an example computer system suitable for practicing the present invention.

FIG. 2 illustrates an example computer system suitable for practicing the present invention. As shown, example computer system 200 includes processor 202, ROM 203 including basic input/output system (BIOS) 205, and system memory 204 coupled to each other via "bus" 206. Also coupled to "bus" 206 are non-volatile mass storage 208, display device 210, cursor control device 212 and communication interface 214. During operation, memory 204 includes working copies of operating system 222, conventional (i.e. non pane-based) applications 224 (if loaded) that use GUI 104 to display graphical output in a conventional manner, and pane-enabled applications 226 to display graphical output in accordance with the teachings of the present invention. In one embodiment, operating system 222 and applications 226 are incorporated with aspects of the present invention to display one or more separately and multi-dimensionally resizable windowpanes.

Except for the teachings of the present invention as incorporated, each of these elements is intended to represent a wide range of these devices known in the art, and performs its conventional functions. For example, processor 202 may be a processor of the Pentium® family available from Intel Corporation of Santa Clara, Calif., which performs its conventional function of executing programming instructions of operating system 222 and applications 224-226, including those implementing the teachings of the present invention. ROM 203 may be EEPROM, Flash and the like, and memory 204 may be SDRAM, DRAM and the like, from semiconductor manufacturers such as Micron Technology of Boise, Id. Bus 206 may be a single bus or a multiple bus implementation. In other words, bus 206 may include multiple properly bridged buses of identical or different kinds, such as Local Bus, VESA, ISA, EISA, PCI and the like.

Mass storage 208 may represent disk drives, CDROMs, DVD-ROMs, DVD-RAMs and the like. Typically, mass storage 208 includes the permanent copy of operating system 222 and applications 224-226. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 210 may represent any of a variety of monitor types including but not limited to a CRT and active/passive matrix LCD display, while cursor control 212 may represent a mouse, a touch pad, a track ball, a keyboard, and the like to control a graphical representation of a cursor (e.g. such as an arrow or other pointer) on a GUI. Communication interface 214 may represent a modem interface, an ISDN adapter, a DSL interface, an Ethernet or Token ring network interface and the like. As those skilled in the art will also appreciate, from the description the follow, the present invention may also be practiced without some of the enumerated elements, e.g. communication interface 214, or with additional elements, such as graphics accelerators, audio and video add-on cards, and so forth.

Figure 3:
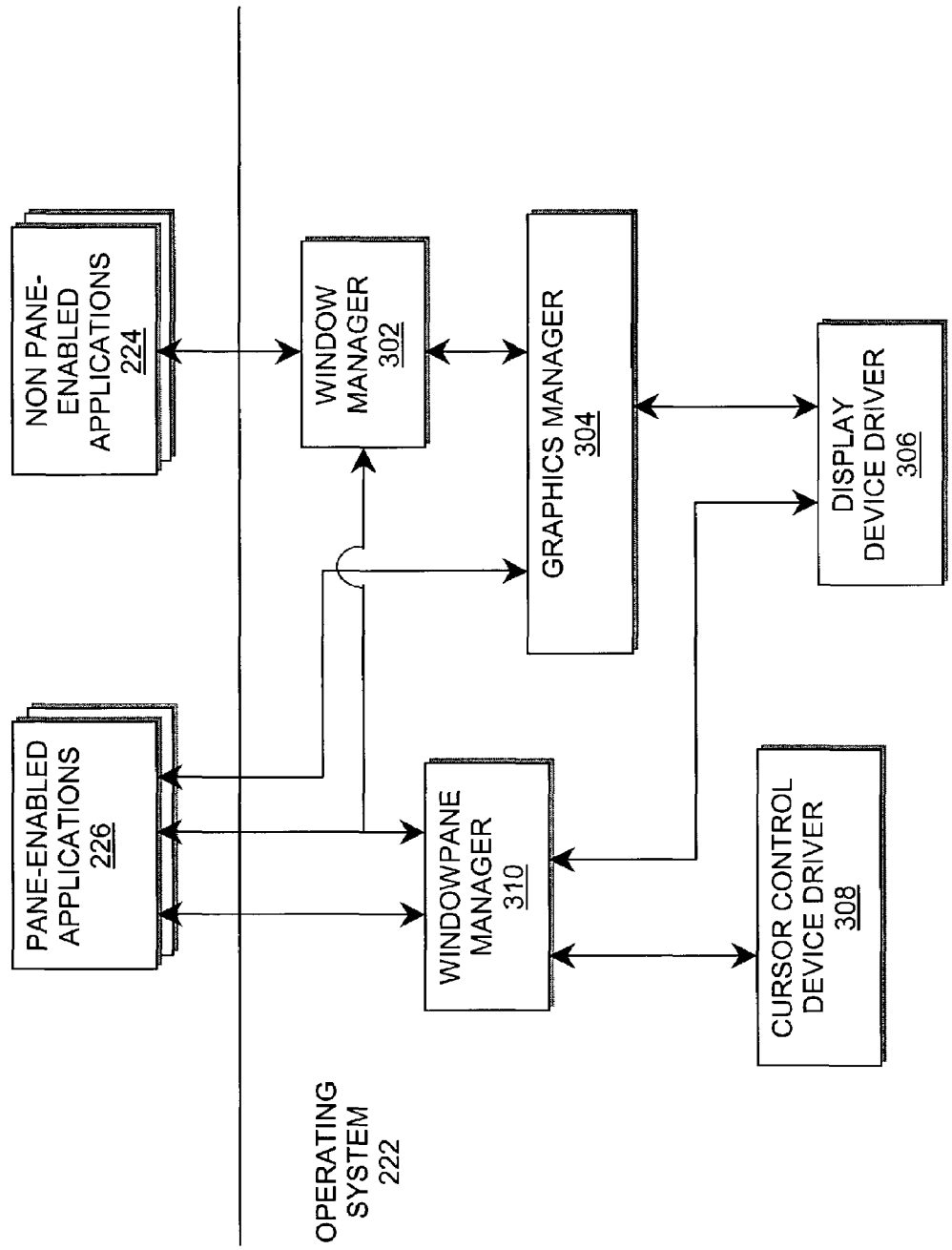
FIG. 3 is a block diagram illustrating one embodiment of an enhanced operating system and its interactions with pane-enabled and non pane-enabled applications.

FIG. 3 is a block diagram illustrating enhanced operating system 222 and its interactions with applications 224-226. As illustrated, operating system 222 includes conventional elements such as window manager 302, graphics manager 304, display device driver 306, and cursor control device driver 308. Each of these elements performs its conventional functions known in the art. That is, window manager 302 performs the conventional function of managing the current display of the various display windows of non pane-based applications 224 in GUI 102. Graphics manager 304 performs the conventional function of rendering graphics objects for an application. For example, in Windows® based operating systems, graphics manager 304 is intended to represent the Graphics Device Interface. Display device driver 306 performs the conventional function of controlling the display device, whereas cursor control device driver 308 performs the conventional function of monitoring movements of a cursor control device and cursor events such as a button click, release, and so forth.

As illustrated, in accordance with the present invention, operating system 222 is also advantageously provided with windowpane manager 310. In one embodiment, windowpane manager 310 is employed to "coordinate" with window manager 302 to enable applications 226 to be able to correspondingly render contents into identified windowpanes, and to respond to cursor device movements and events detected within such windowpanes. For the illustrated embodiment, applications 224 render contents into their windows using graphics manager 304 through window manager 302, whereas windowpane-enabled applications 226 render contents using e.g. direct draw functions of graphics manager 304. These and other aspects will be described more fully below.

FIG. 3 is intended to represent an example implementation of operating system 222. In an alternative embodiment, logic associated with one or more pane-enabled applications 226 may be incorporated within operating system 222 such that the functionalities provided by pane-enabled applications 226 appear as being native to operating system 222. For example, in the event that pane-enabled applications 226 represent a media player application containing one or more resizable windowpanes according to various embodiments of the invention, all or a part of such media player functionality can be included within operating system 222. Similarly, although windowpane manager 310 is shown as being part of operating system 222, windowpane manager 310 need not necessarily be provided by or distributed with operating system 222. Rather, windowpane manager 310 can be adjunct code, which when executed cooperates with operating system 222 to facilitate the resizable windowpanes of the present invention as described herein.

Figure 4:
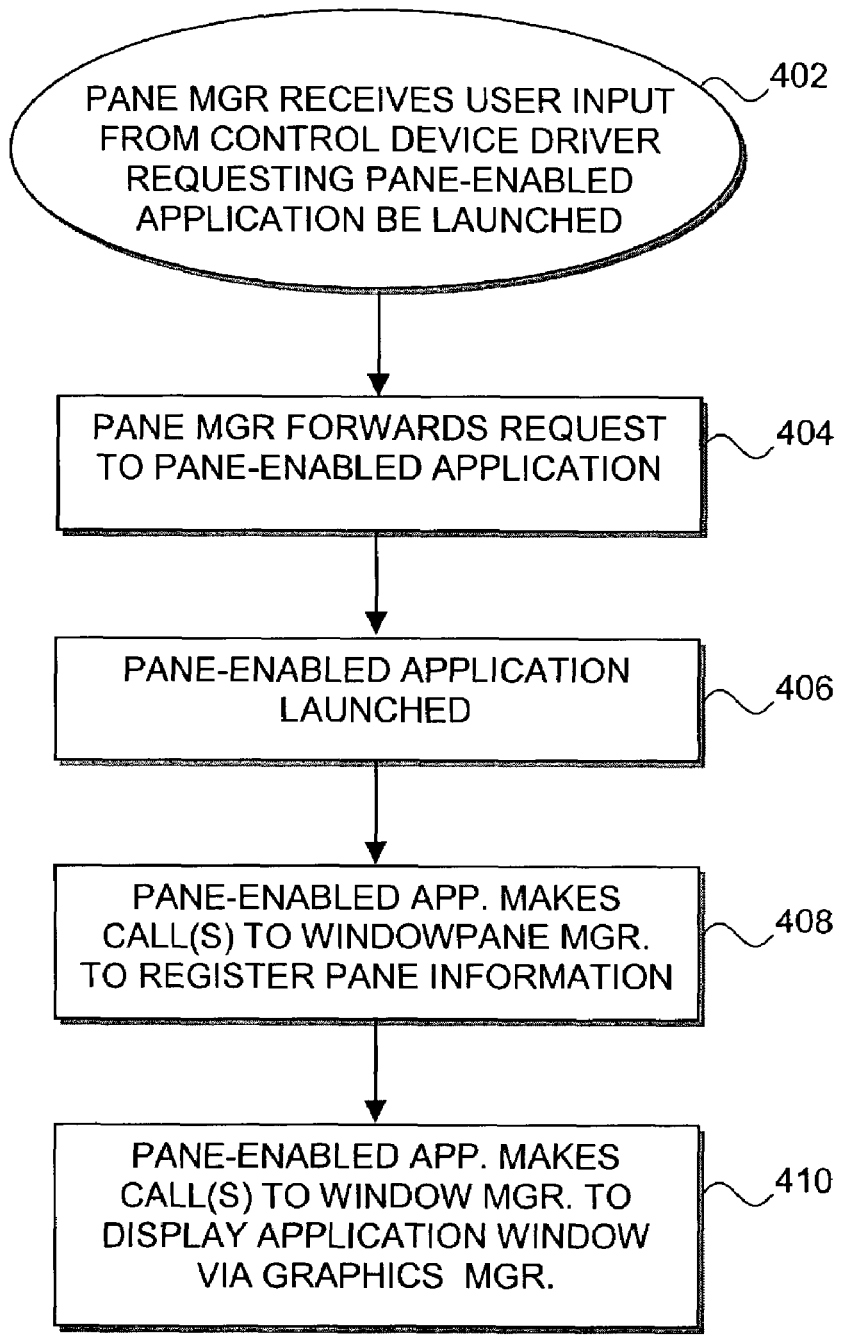
FIG. 4 is an operational flow diagram illustrating one embodiment of a pane-enabled application initialization process, according to one embodiment of the invention.

FIG. 4 is an operational flow diagram illustrating one embodiment of a pane-enabled application initialization process, according to one embodiment of the invention. The process begins at block 402 where the windowpane manager (310) receives input from control device driver (308) requesting that a pane-enabled application be launched. The windowpane manager (310) forwards such request to the appropriate pane-enabled application (226), block 404, causing the pane-enabled application (226) to be launched, block 406. The pane-enabled application then makes one or more calls to the windowpane manager (310) to register pane-related information such as, but not limited to size and location based coordinates, block 408. The pane-enabled application further makes one or more calls to the window manager (302) to display an application window (106) containing one or more windowpanes (110,120) via the graphics manager (304), block 410.

Figure 5:
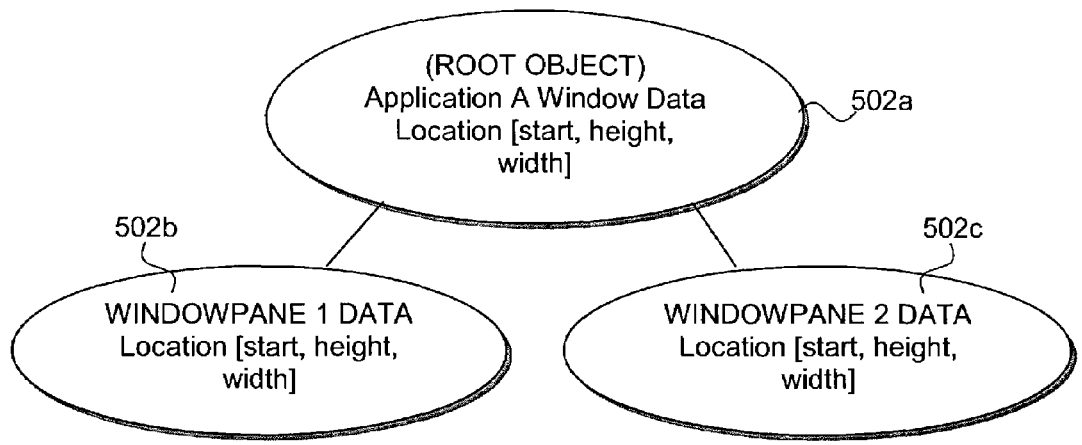
FIG. 5 illustrates an exemplary data organization model suitable for use to store various window and windowpane related data to practice the present invention, in accordance with one embodiment.

FIG. 5 illustrates an exemplary data organization model suitable for use to store various window and windowpane related data to practice the present invention, in accordance with one embodiment. As illustrated, for the embodiment, window and windowpane data is stored in one or more data structures implemented in an object-oriented manner. In one embodiment, one data structure is maintained for each application window 106 displayed. As illustrated, each application window data structure includes a root object 502a to maintain data associated with at least the location at which application window 106 is displayed upon desktop 104.

Additionally, each application window data structure includes a number of "anchor" data objects 502b, 502c, one each for each windowpane supported by the application window. "Anchor" data objects 502b, 502c may include a number of windowpane specific control data variables such as the length of time a cursor is present within a pane, location coordinates for one or more graphical controls such as a resize control or buttons overlaid upon the pane, min/max height/width constraints, and so forth. In one embodiment, windowpane manager 310 dynamically accesses and updates the data stored within the application window and windowpane data structures.

Figure 6:
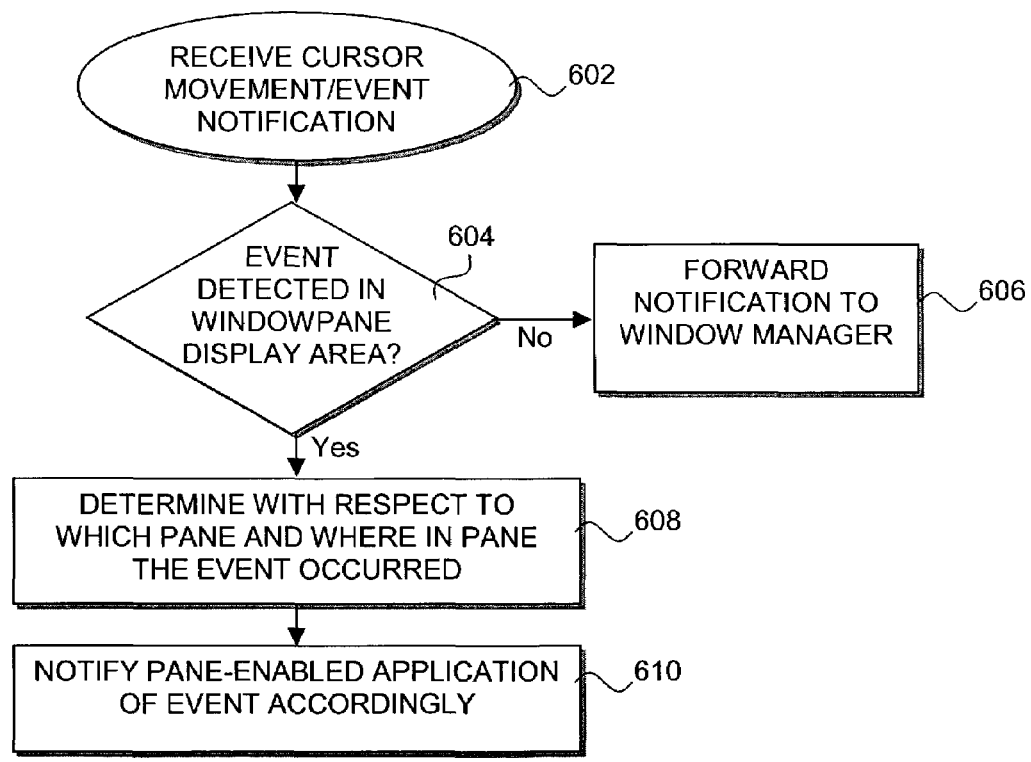
FIG. 6 is an operational flow diagram illustrating operation by a windowpane manager for filtering cursor movement/event notifications, in accordance with one embodiment of the invention.

FIG. 6 is an operational flow diagram illustrating operation by the windowpane manager for filtering cursor movement/event notifications, in accordance with one embodiment of the invention. Upon receipt of a cursor movement/event notification at block 602, the windowpane manager (310) determines whether the movement/event was detected in a windowpane display area, block 604. If the movement/event was not detected in a windowpane display area, the windowpane manager (310) forwards the notification to the window manager (302). From there, operations proceed conventionally as in the prior art. If, however, the movement/event was detected in a windowpane display area at block 604, the windowpane manager (310) determines with respect to which windowpane the event occurred, block 608. Thereafter, the pane-enabled application associated with the determined pane is notified of the event for further processing, block 610. The manner in which the notification is handled is application dependent.

Figure 7:
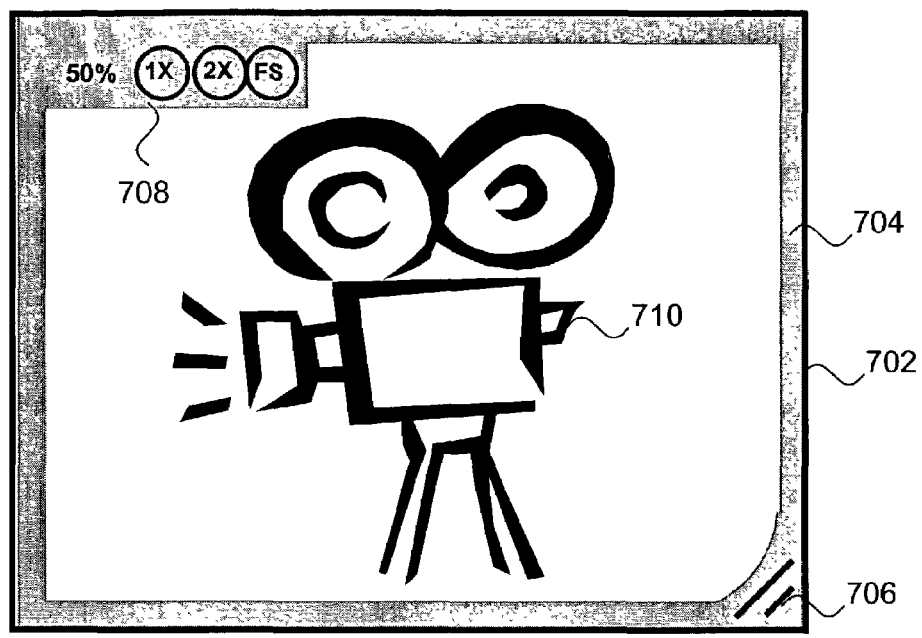
FIG. 7 illustrates one embodiment of a graphical resizing overlay to facilitate resizing of a windowpane.

FIG. 7 illustrates one embodiment of a graphical resizing overlay used to facilitate the resizing of an associated windowpane. In one embodiment of the invention, graphical resizing overlay (hereinafter "resizing overlay") 704 is superimposed upon (i.e. displayed over at least a portion of, or displayed in connection with) windowpane 702 and corresponding content 710. In one embodiment, content 710 represents video content rendered within windowpane 702, however a variety of other media and data types may be rendered within windowpane 702 such as audio/video, text, images, graphics, web pages, and so forth. In one embodiment, resizing overlay 704 is superimposed upon windowpane 702 in response to a cursor control event occurring, such as but not limited to a cursor indicating one or more pixels located within the area defined by windowpane 702.

Once displayed, resizing overlay 704 can be employed by a user to dynamically resize windowpane 702 and corresponding content 710 an arbitrary (i.e. non-discrete) amount using e.g. resize drag control 706. More particularly, through the use of resizing overlay 704, a user is not constrained (except by the size of the desktop) as to how large or small windowpane 702 can be resized to. In one embodiment, if windowpane 702 is increased so as to exceed the original footprint of the container application window, the container application window is correspondingly increased in size so as to not unnecessarily limit the possible sizes of windowpane 702. In addition to providing facilities to arbitrarily resize windowpane 702, resizing overlay 704 also provides for the resizing of windowpane 702 and corresponding content 710 via resize selection controls 708. Resize selection controls 708 include a variety of predefined windowpane magnification factors including, but not limited to 1×, 2× and full screen. In one embodiment, resizing overlay 704 is removed (i.e. ceases to be displayed) from windowpane 702 upon the occurrence of one or more events, such as the cursor being removed from windowpane 702, a predetermined amount of time elapsing from when resizing overlay 704 was first displayed, and so forth.

Furthermore, in addition to resize selection controls 708, one or more graphical content controls (not pictured) may be displayed within windowpane 702 to facilitate changing of the content perspective displayed within windowpane 702 by a user. For example, by selecting a graphical control displayed within windowpane 702 in association with the displayed content, a user may cause the perspective content to change. In one embodiment, selection of such a graphical control may cause the content to change in accordance with one of multiple available camera angles.

Figure 8:
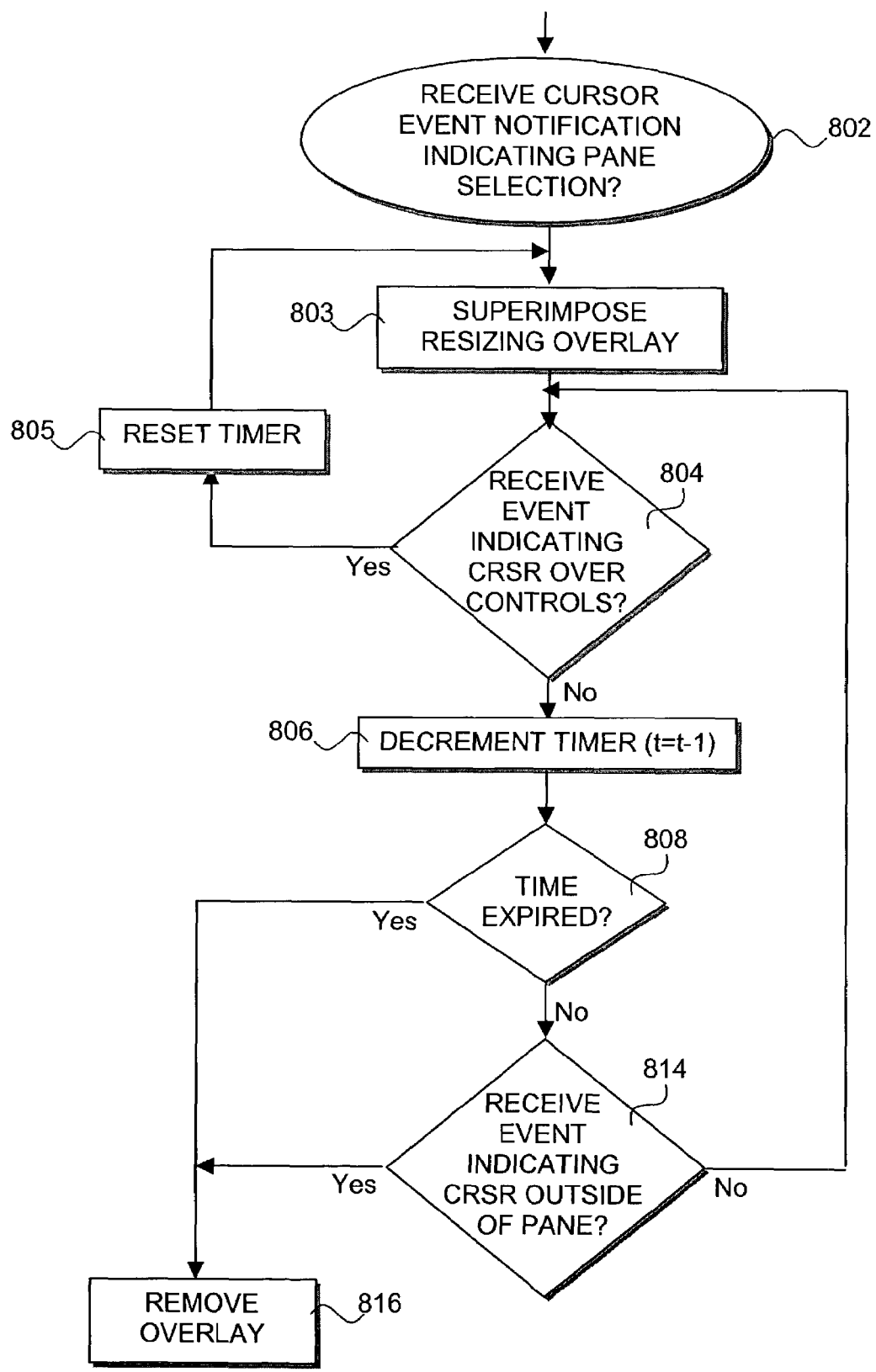
FIG. 8 illustrates an operation flow diagram depicting operation of resizing overlay 704 in accordance with one embodiment.

FIG. 8 illustrates an operation flow diagram of a pane-enabled application depicting operation of resizing overlay 704 in accordance with one embodiment. FIG. 9 shows various windowpane instances illustrating various conditions for the superimposition and corresponding removal of resizing overlay 704, in accordance with one embodiment as described with respect to FIG. 8. Accordingly, the following description is merely illustrative and references both FIGS. 8 and 9.

The illustrated process begins with a pane-enabled application 226 receiving a cursor event notification (e.g. from cursor control device driver via windowpane manager 310) indicating that a cursor was moved over a windowpane of pane-enabled application 226 (block 802 & FIGS. 9A-9B). In response, pane-enabled application 226 generates resizing overlay 704, which is then superimposed over windowpane 702, (block 803 & FIGS. 9A-9B). At block 804 a determination is made as to whether a cursor/movement event has been received indicating that the cursor was moved over resize selection control 708, (block 804 & FIG. 9E). In the illustrated embodiment, resizing overlay 704 is transitory, in that it persists for a limited duration so as to not unduly obstruct the content and detract from the user experience. Accordingly, if the cursor was not moved over resize selection control 708, a timer is started (or decremented if already started) to determine when resizing overlay 704 should be removed (block 806). At block 808 a determination is made as to whether the timer has expired. If the timer has expired, the overlay is removed (block 816 & FIG. 9C). If, however the timer has not expired, a further determination is made as to whether a cursor/movement event is received indicating that the cursor has been moved to a location on the desktop outside of the windowpane (block 814). If however, such a cursor/movement event is not received, a determination is again made as to whether a cursor/movement event has been received indicating that the cursor was moved over resize selection control 708 (block 804 & FIG. 9D). If the cursor was moved over resize selection control 708, the timer is reset and overlay resizing overlay 704 continues to be displayed.

Figure 10:
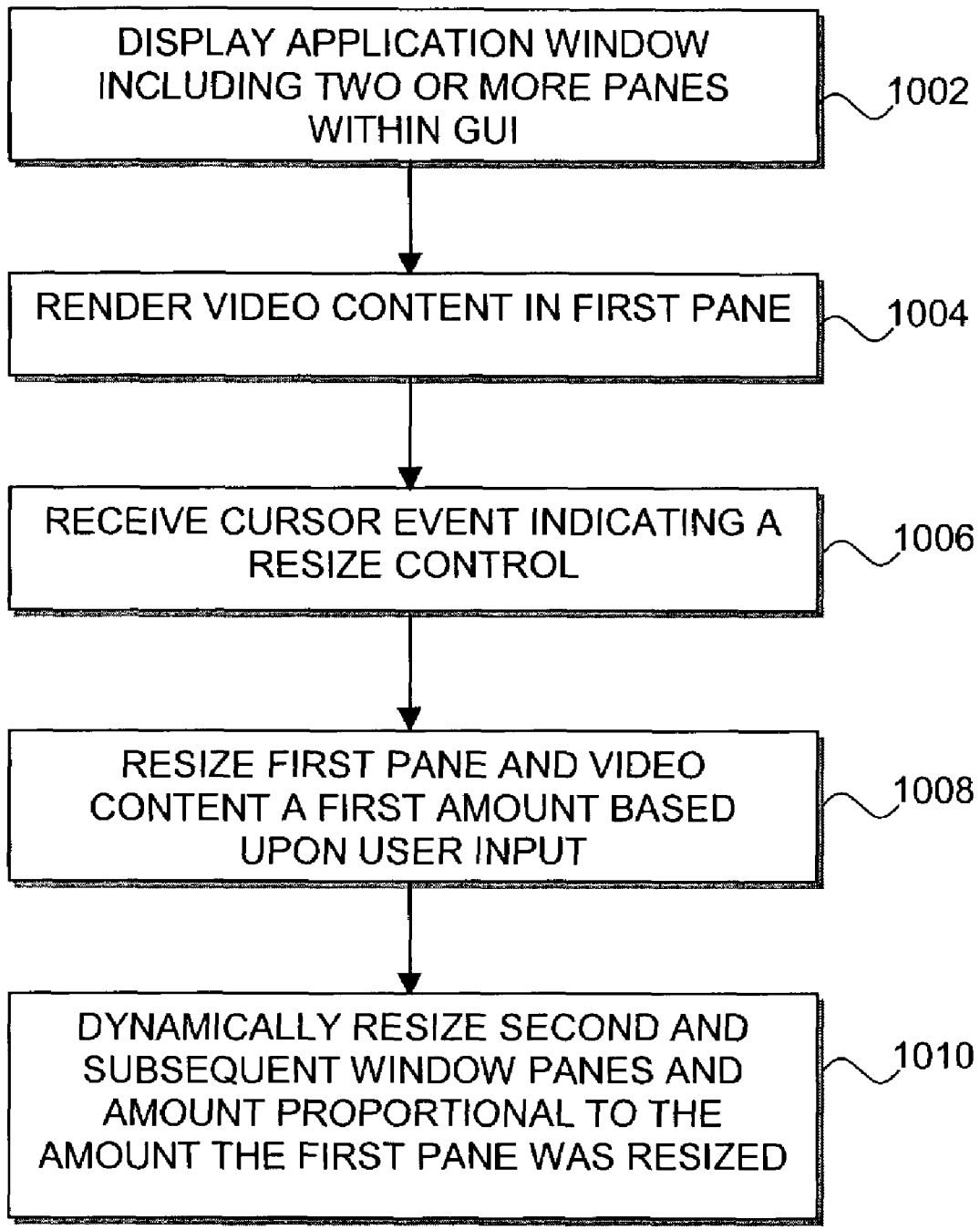
FIG. 10 represents an operational flow diagram illustrating one method for multi-windowpane resizing, in accordance with one embodiment of the invention.

FIGS. 10 and 11A-C illustrate various methods for contemporaneously resizing multiple windowpanes in a multi-paned application window. FIG. 10 represents an operational flow diagram illustrating one method for multi-windowpane resizing, in accordance with one embodiment of the invention. The method illustrated in FIG. 10 begins with a pane-enabled application displaying an application window (e.g. application window 106) including two or more windowpanes within a GUI such as GUI 102, block 1002. The pane enabled application then renders content within one or more of the windowpanes. In the illustrated embodiment, video content is rendered within a first of the windowpanes, block 1004. At block 1006, a cursor event is received indicating that a windowpane resize control has been identified, block 1006. In one embodiment, a cursor event, indicating that the windowpane resize control has been selected, is received in response to a graphical control displayed within the GUI being selected by a user.

A windowpane resize control may take the form of any of a number of controls to enable a user to resize one or more windowpanes in accordance with the teachings of the invention. In one embodiment, a windowpane resize control may be graphical such as selection control 708, resize drag control 706, or a variety of other resize controls including but not limited to horizontal and vertical splitters, top level application view menus, "right click" functions selectable from a menu by a user in response to clicking the right mouse button or an equivalent "secondary" mouse button, and so forth. However, in other embodiments, windowpane resize controls may be non-graphical such as logic functions (e.g. JavaScript functions), voice commands, one or more keystrokes or keystroke combinations, and so forth. For example, using a keyboard a user may cause the video to be resized to its native size by using a 'CTRL−1' keystroke combination, whereas the user may cause the video to be displayed twice its native size using a 'CTRL+2' keystroke combination, and so forth. Similarly, a user may use one or more keystroke combinations as a resize control to move a horizontal or vertical splitter upward or downward in lieu of selecting the splitter(s) with e.g. a mouse.

In response to user input (e.g. received via a resize control associated with the first windowpane, whether graphical or otherwise), the first windowpane and corresponding content is resized, block 1008. In response to the resizing of the first windowpane, the second and subsequent (if any) windowpanes are contemporaneously resized by an amount proportional to the amount the first window pane was resized, block 1010.

In various embodiments, an application window control may additionally function as a windowpane resize control. For example, in FIG. 11A, resized application window 1106 is shown containing resized windowpane 1110 (having a height ($h_1$) and width ($w_1$)), and windowpane 1120 (having a height ($h_2$) and width ($w_2$)). As illustrated, each of resized windowpanes 1110 and 1120 were resized from original windowpane 1110' having an original height ($h_1'$) and original width ($w_1'$), and original windowpane 1120' having an original height ($h_2$) and original width ($w_2$), respectively. In the illustrated embodiment, the resizing of windowpanes 1110 and 1120 occurred in response to a user decreasing the height of application window 1106 by selecting and dragging the bottom horizontal border from position A' to position A. This resulted in the lower corner shared between windowpane 1110' and 1120' being moved from point B' to point B thereby resulting in windowpane 1110 having a decreased height ($h_1$) and width ($w_1$), and windowpane 1120' having a decreased height ($h_2$) and an increased width ($w_2$). Moreover, the width ($w_1$) of windowpane 1110 decreased and amount proportional to the amount that the width ($w_2$) of windowpane 1120 increased. In the illustrated embodiment, the aspect ratio of windowpane 1110 is locked such that the single horizontal height adjustment to application window 106 caused both a height and width adjustment of equal amounts to occur. In one embodiment of the invention, one windowpane can be assigned priority over one or more other windowpanes such that upon resizing, the aspect ratio of the priority windowpane remains constant while the remaining windowpanes are adjusted based upon e.g. predetermined heuristics. For example, as the size of windowpane 1110 (and corresponding content) is decreased in an aspect ratio-locked manner as shown, content displayed within windowpane 1120 may be rearranged based upon predetermined heuristics governing the display of such secondary (i.e. not prioritized) content. This is particularly useful in cases where a windowpane displays rendered video content. In such cases, the relative sizes of the windowpanes can be increased/decreased while the aspect ratio of the rendered video content remains constant, thus not obstructing the rendered video with one or more scroll bars or otherwise detracting from the user experience. Moreover, the content in the remaining windowpanes (if any) is automatically reorganized to further facilitate viewing.

In one embodiment, one or more minimum and maximum height and/or width constraints may be utilized to limit or otherwise effect the resizing of windowpanes in accordance with the teachings of the invention. For example, maximum width/height values can be stipulated with respect to a first windowpane (e.g. one rendering contextual information) such that the width/height of that windowpane will remain at the maximum defined value, if a user attempts to increase the width/height of that windowpane beyond the maximum value set. Accordingly, the remaining panes can be kept from decreasing to an insufficient or non-viewable size so as to not significantly detract from the user experience.

Figure 11A:
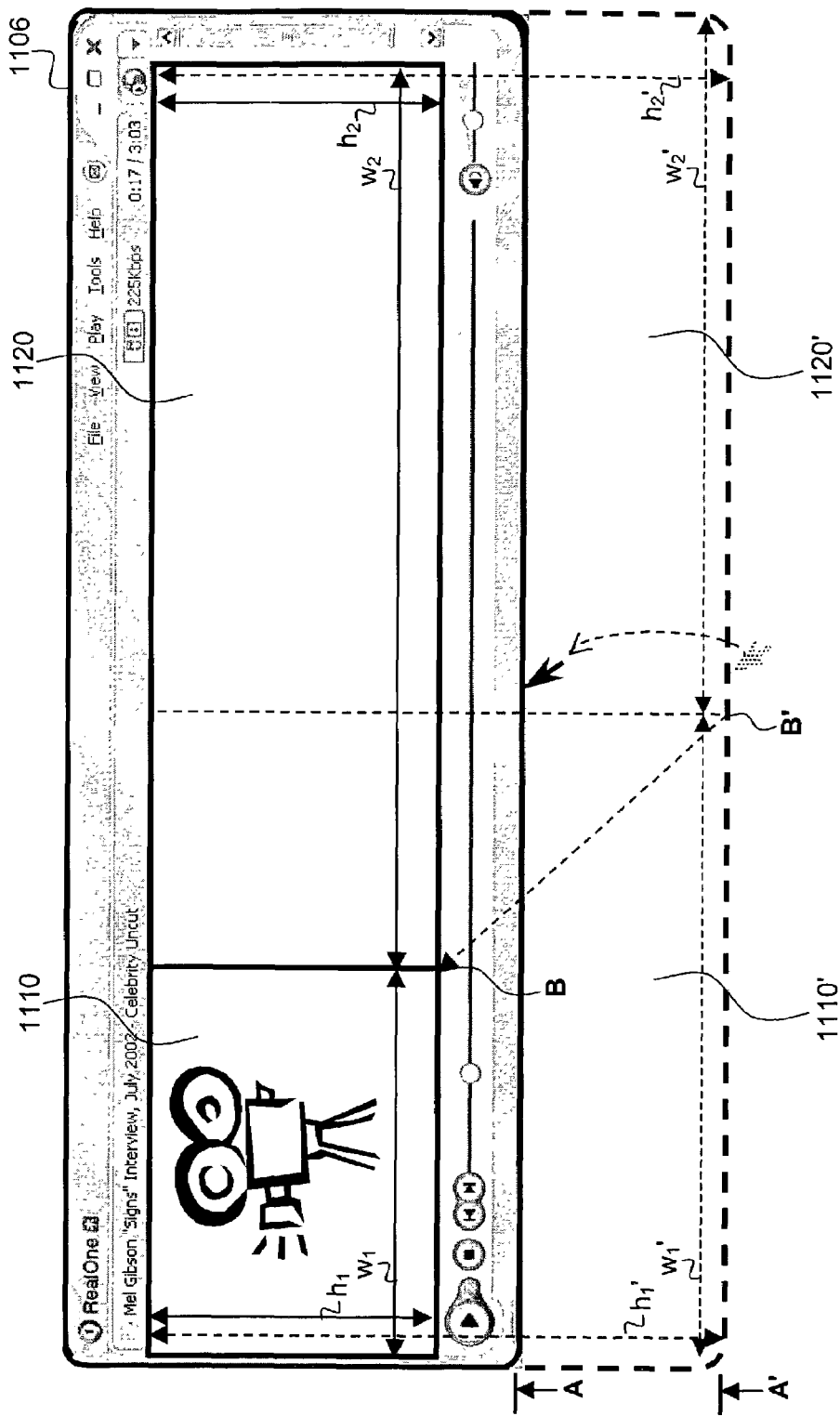
FIGS. 11A-C graphically represents methods for contemporaneously resizing multiple windowpanes in accordance with various embodiments of the invention.
Figure 11B:
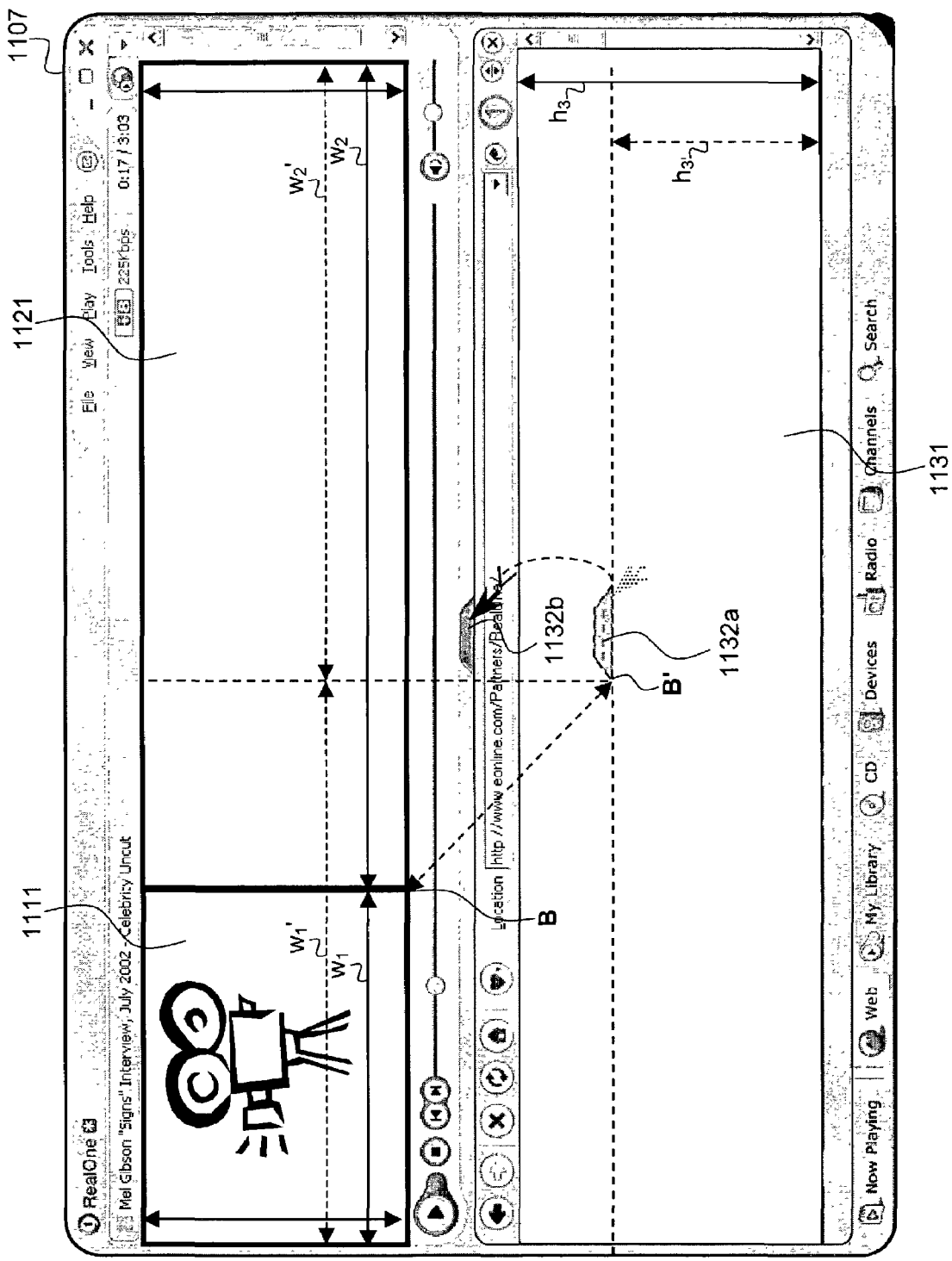

FIG. 11b graphically represents a method for contemporaneously resizing multiple windowpanes of a three-paned application window using a horizontal splitter. Application window 1107 contains windowpanes 1111, 1121, and 1131 as well as horizontal splitter 1132 as shown. In accordance with one embodiment of the invention, by moving horizontal splitter 1132 from a first position (1132a) to a second position (1132b), the height of windowpane 1131 is increased from $h_3'$ to $h_3$, while the heights of windowpanes 1111 and 1121 are decreased a proportional amount. Furthermore, the width of windowpane 1111 is decreased from $w_1'$ to $w_1$, while the width of windowpane 1121 is increased from $w_2'$ to $w_2$, causing the lower corner shared between windowpane 1111 and 1121 to be moved from point B' to point B. This all occurs while the size/footprint of application window 1107 remains fixed.

Figure 11C:
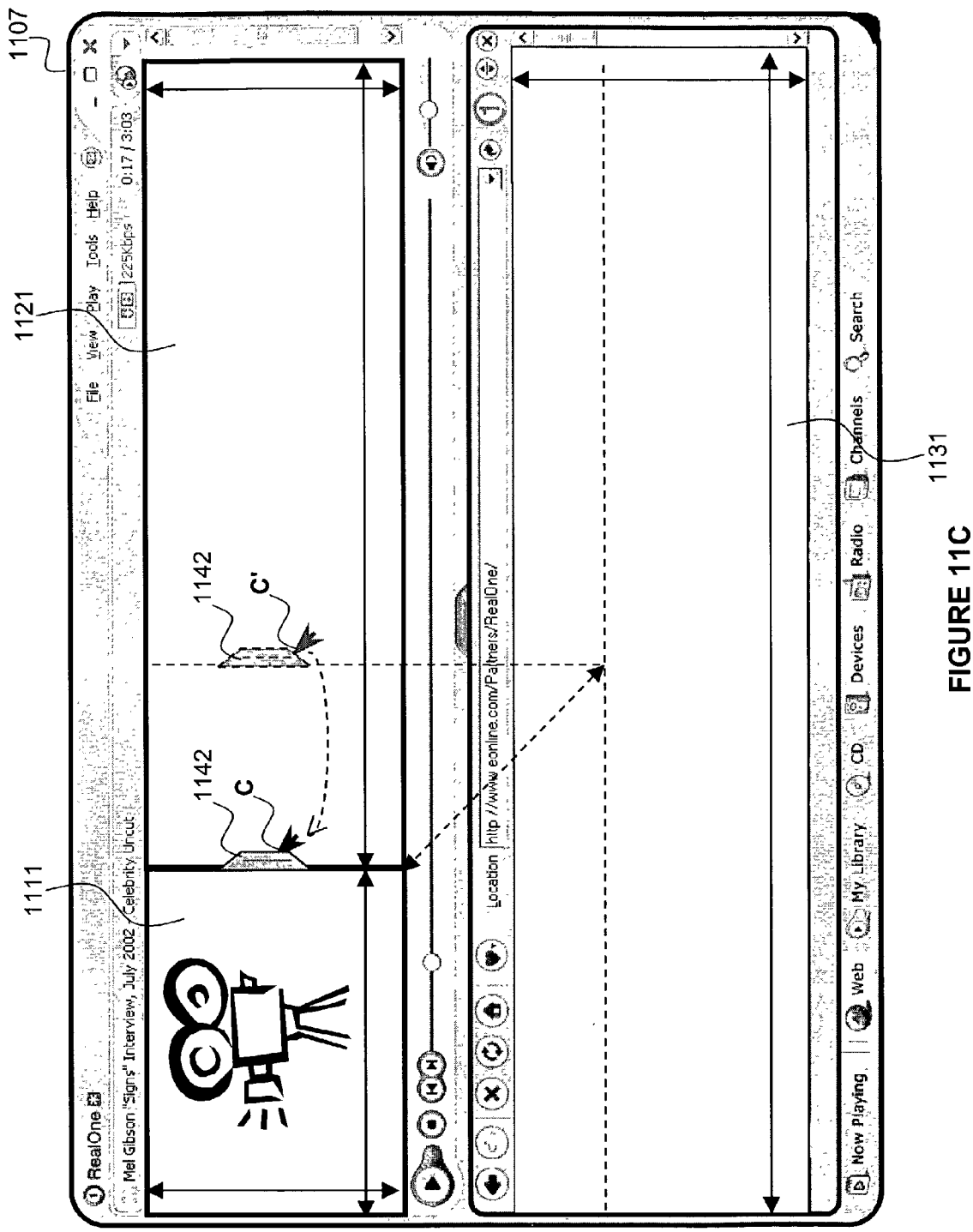

FIG. 11C graphically represents a method for contemporaneously resizing multiple windowpanes of a three-paned application window using a vertical splitter. As shown, as vertical splitter 1142 is moved from point C' to point C, windowpanes 1111, 1121 and 1131 are proportionally resized in a manner similar to that caused by horizontal splitter 1132.

Figure 12:
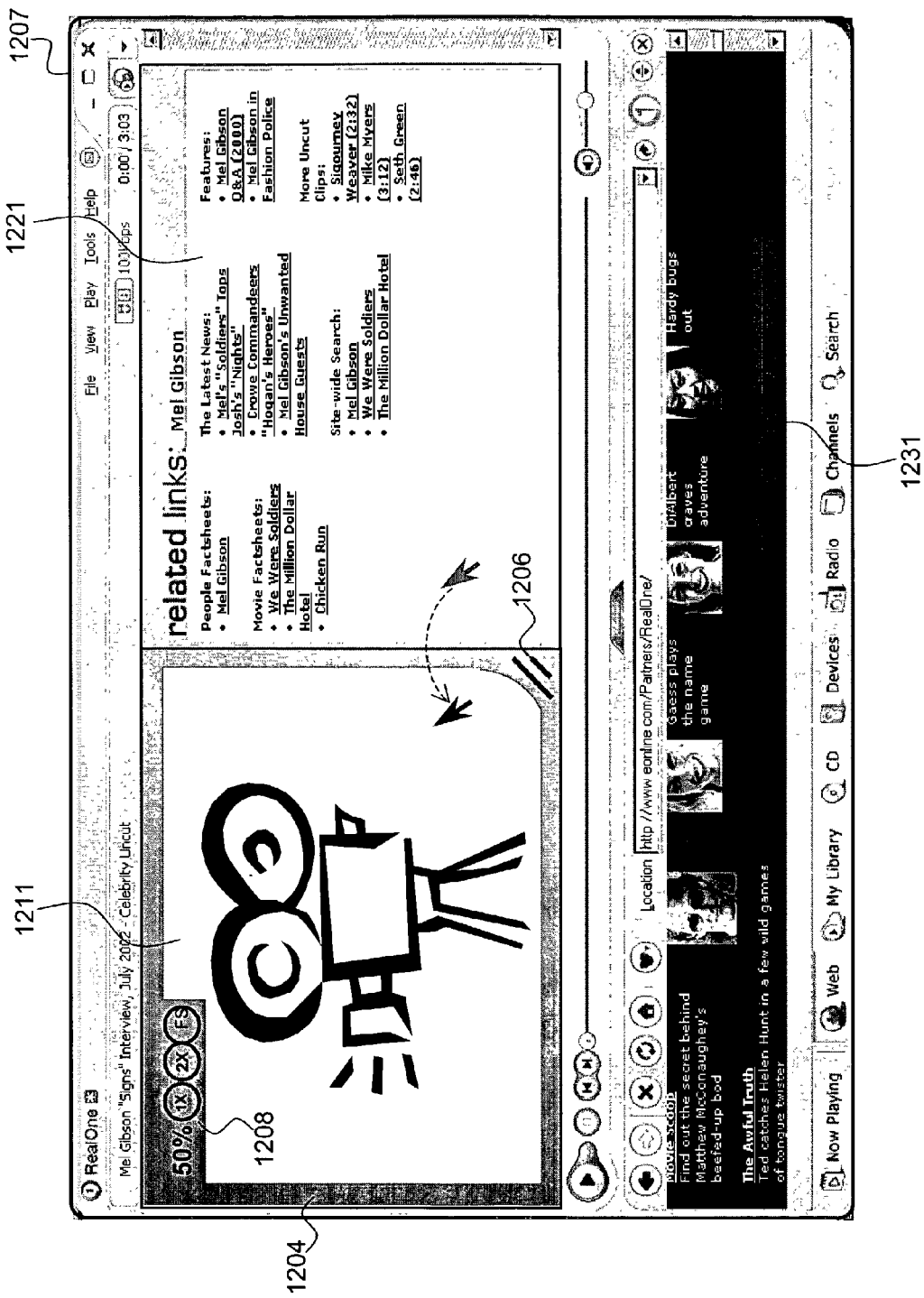
FIG. 12 illustrates a graphical resizing overlay used the context of an application window containing multiple panes.

FIG. 12 illustrates a graphical resizing overlay used in the context of an application window containing multiple panes. Application window 1207 contains windowpane 1211, windowpane 1221 and windowpane 1231 as shown. In the illustrated embodiment, windowpane 1231 displays one or more web pages based upon user input, windowpane 1211 displays streaming video content based upon user input provided through windowpane 1231 (and/or windowpane 1221), and windowpane 1221 displays HTML-based or other types of context information associated with the rendered video content of windowpane 1211. Additionally, superimposed upon windowpane 1211 is resizing overlay 1204, which in turn includes resize selection controls 1208 and resize drag control 1206 to facilitate arbitrary resizing of windowpane 1211 within application window 1207, while dynamically resizing window panes 1221 and 1231 proportionally.

Figure 13:
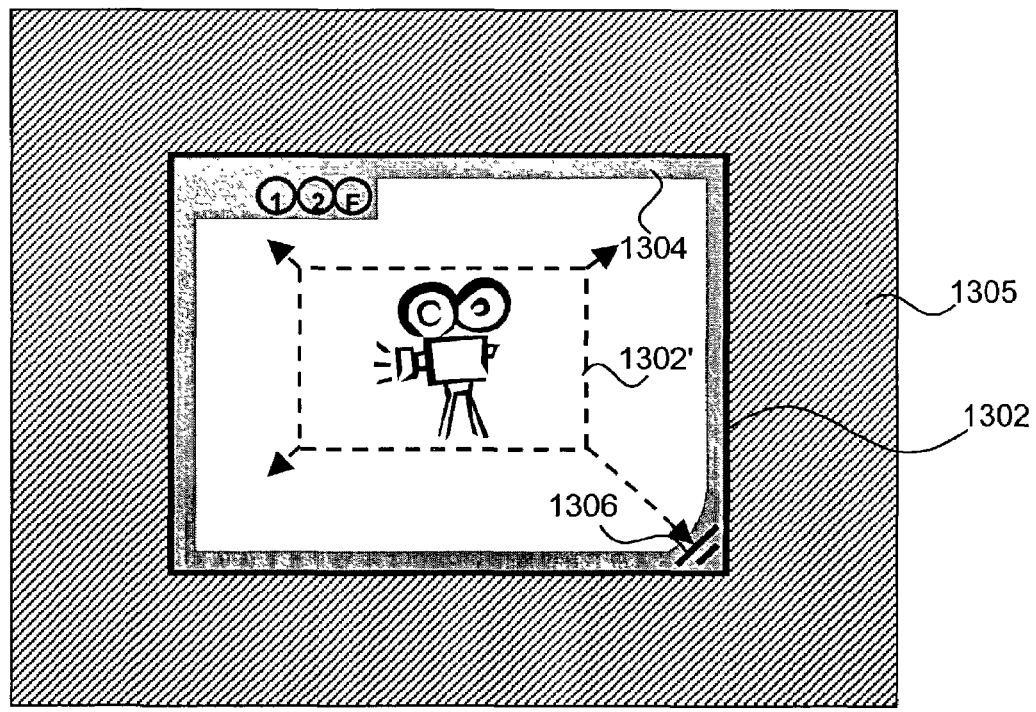
FIG. 13 illustrates a graphical resizing overlay used in a full-screen mode in accordance with one embodiment of the invention.

FIG. 13 illustrates a graphical resizing overlay used in a full-screen mode in accordance with one embodiment of the invention. In the illustrated embodiment desktop 1305 is blackened such that any menu bars, toolbars, icons, graphics, application specific controls (other than those associated with the resizing overlay 1304), and so forth, normally displayed upon desktop 1305, are temporarily hidden and a black desktop background is applied. Windowpane 1302 is then displayed on the desktop (e.g. without an accompanying container application window) to render video content from a source such as a DVD, or streaming media server for example. In accordance with one embodiment of the invention, resizing overlay 1304 is superimposed upon windowpane 1302 in response to a cursor being moved within windowpane 1302, to facilitate arbitrary resizing of windowpane 1302 as described above. For example, in the illustrated embodiment windowpane 1302' denotes the size or footprint of windowpane 1302 before it was resized (e.g. using resizing overlay 1304) to yield current windowpane 1302. In one embodiment, windowpane 1302 is displayed in the center of desktop 1305 resulting in a blackened border extending to the edge of desktop 1305 to provide a theater-like experience to the user.

EPILOG

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
   rendering video content within a windowpane displayed upon a graphical user interface (GUI), the rendered video content displayed in a proportional relation to the windowpane;
   positioning a cursor to a location within the GUI responsive to a user input; and
   upon positioning of said cursor within said windowpane, automatically superimposing a graphical resizing overlay over the windowpane to facilitate arbitrary resizing of the windowpane and corresponding video content by the user when the cursor is positioned within the windowpane, the arbitrary resizing maintaining the proportional relation between the rendered video content and the windowpane.

2. The method of claim 1, wherein the graphical resizing overlay is displayed in response to the cursor being moved from a first location outside of the windowpane to a second location inside the windowpane.

3. The method of claim 2, wherein the overlay is transitory and disappears a predefined period of time after being displayed.

4. The method of claim 3, wherein the overlay is redisplayed when the cursor is moved to a resize selection control area fixed with respect to the overlay.

5. The method of claim 4, wherein the resize control area includes a full-screen mode control and one or more predetermined window zoom controls.

6. The method of claim 2 wherein the overlay is transitory and disappears when the cursor is moved from a first location within the windowpane to a second location outside of the windowpane.

7. The method of claim 6, wherein said overlay is redisplayed when the cursor is moved to a location back within the windowpane.

8. The method of claim 1, wherein the graphical resizing overlay facilitates arbitrary resizing of the video content while the video content maintains a constant aspect ratio.

9. The method of claim 1, wherein rendering comprises:
blackening the GUI entirely; and
rendering the video content so as to be centered upon the blackened GUI.

10. The method of claim 8, further comprising:
resizing the video content, wherein the video content maintains a constant aspect ratio.

11. A method comprising:
displaying an application window within a graphical user interface (GUI), the application window including at least first windowpane and a second windowpane;
rendering video content within the first windowpane, the video content having a first display size that is in a proportional relation to the first windowpane;
upon positioning of a cursor within said first windowpane, automatically superimposing a graphical resizing overlay over said first windowpane;
resizing the first windowpane and the corresponding video content via said graphical resizing overlay by a first amount resulting in a second display size wherein the corresponding video content remains in the proportional relation to the first windowpane; and
dynamically resizing the second windowpane by a second amount proportional to the first amount such that the video content remains unobstructed by the first and second windowpanes and the application window and remains in the proportional relation to the first windowpane.

12. The method of claim 11, wherein the application window remains a constant size during the resizing of the first and second windowpanes.

13. The method of claim 11, further comprising:
determining if a cursor indicates a first location within the GUI corresponding to one or more pixels associated with the rendered video content; and
superimposing a transitory graphical resizing overlay around at least a portion of the rendered video content to facilitate arbitrary resizing of the video content by a user, if the cursor indicates the first location.

14. The method of claim 13, wherein the graphical resizing overlay is displayed when the cursor is moved to the first location within the first windowpane from a location outside of the first windowpane.

15. The method of claim 14, wherein the overlay is transitory and disappears a predefined period of time after being displayed.

16. The method of claim 15, wherein the overlay is redisplayed when the cursor is moved to a resize selection control area fixed with respect to the overlay.

17. The method of claim 16, wherein the resize control area includes a full-screen mode control and one or more predetermined window zoom controls.

18. The method of claim 14, wherein the overlay is transitory and disappears when the cursor is moved to a location outside of the first windowpane.

19. The method of claim 18, wherein overlay is redisplayed when the cursor is moved back to a location within the first windowpane.

20. The method of claim 13, wherein the graphical resizing overlay facilitates arbitrary resizing of the video content while maintaining a constant aspect ratio within the displayed video content.

21. The method of claim 13, wherein the graphical resizing overlay is superimposed around the first windowpane.

22. The method of claim 11, wherein the second windowpane contains contextual information associated with the video content displayed in the first pane.

23. The method of claim 11, wherein rendering video content comprises rendering a video stream.

24. The method of claim 11, wherein the resizing of each of the first and second windowpanes is constrained by a minimum windowpane height, a maximum windowpane height, a minimum windowpane width, and a maximum windowpane width.

25. The method of claim 11, wherein one of the first and second windowpanes is given priority over the remaining windowpane such that content displayed within the windowpane having the priority is resized so as to maintain a constant aspect ratio.

26. The method of claim 11, wherein rendering comprises:
blackening the GUI; and
rendering the video content so as to be centered upon the blackened GUI.

27. The method of claim 26, wherein the aspect ratio of the rendered video content remains constant during resizing of the video content.

28. The method of claim 11, further comprising:
a 3rd windowpane within the application window to natively display HTML pages within the application window.

29. The method of claim 11, wherein the first windowpane is resized based at least in part upon received user input.

30. The method of claim 11, wherein the first windowpane is resized based at least in part upon one or more logic functions.

31. A method comprising:
displaying an application window within a graphical user interface (GUI), the application window including at least a first windowpane;
rendering video content within the first windowpane, the video content having a first display size that is in a proportional relation to the first windowpane;
upon positioning of a cursor within said first windowpane, automatically superimposing a graphical resizing overlay over said first windowpane;
providing one or more icons indicating information related to the video content within the first windowpane; and
resizing the first windowpane, the one or more icons and the corresponding video content via said graphical resizing overlay by a first amount resulting in a second display size that remains in the proportional relation to the first windowpane, the resizing based at least in part upon received user input.

32. The method of claim 31 wherein resizing the first windowpane resizes the one or more icons and the corresponding video content proportionately as a result of a single movement of the cursor.

33. The method of claim 31, wherein the one or more icons indicate a camera angle for viewing of the video content.

34. An apparatus comprising:
a storage medium having stored therein programming instructions designed to enable the apparatus to
render video content within a windowpane displayed upon a graphical user interface (GUI), the rendered video content in a proportional relation to the windowpane,
position a cursor to a location within the GUI responsive to a user input,
upon positioning of said cursor within said windowpane, automatically superimpose a graphical resizing overlay over the windowpane to facilitate arbitrary resizing of the windowpane and corresponding video content by the user when the cursor is positioned within the windowpane such that the rendered video content remains in the relational proportion to the windowpane; and at least one processor coupled with the storage medium to execute the programming instructions.

35. The apparatus of claim 34, wherein said graphical resizing overlay facilitates arbitrary resizing of the video content while the video content maintains a constant aspect ratio.

36. The apparatus of claim 34, wherein the programming instructions further comprise programming instructions to
blacken the GUI entirely; and
render the video content so as to be centered upon the blackened GUI.

37. An apparatus comprising:
a storage medium having stored therein programming instructions designed to enable the apparatus to
display an application window within a graphical user interface (GUI), the application window including at least a first windowpane and a second windowpane,
render video content within the first windowpane, the video content having a first display size, the rendered video content in a proportional relation to the windowpane,
upon positioning of a cursor within said first windowpane, automatically superimposing a graphical resizing overlay over said first windowpane;
resize the first windowpane and the corresponding video content by a first amount via said graphical resizing overlay resulting in a second display size, the resizing based at least in part upon received user input; and
dynamically resize the second windowpane by a second amount proportional to the first amount such that the video content remains unobstructed by the first and second windowpanes and the application window and remains in the proportional relation to the first window pane; and at least one processor coupled with the storage medium to execute the programming instructions.

38. The apparatus of claim 37, wherein the application window remains a constant size during the resizing of the first and second windowpanes.

39. The apparatus of claim 37, wherein one of the first and second windowpanes is given priority over the remaining windowpane such that content displayed within the windowpane having the priority is resized so as to maintain a constant aspect ratio.

40. An apparatus comprising:
a storage medium having stored therein programming instructions designed to enable the apparatus to
display an application window within a graphical user interface (GUI), the application window including at least a first windowpane,
render video content within the first windowpane, the video content having a first display size that is in a proportional relation to the windowpane,
upon positioning of a cursor within said first windowpane, automatically superimposing a graphical resizing overlay over said first windowpane;
provide one or more icons indicating information related to the video content within the first windowpane, and
resize the first windowpane, the one or more icons and the corresponding video content via said graphical resizing overlay by a first amount resulting in a second display size that remains in the proportional relation to the first windowpane, the resizing based at least in part upon received user input; and
at least one processor coupled with the storage medium to execute the programming instructions.

41. The apparatus of claim 40 wherein the programming instructions designed to resize the first windowpane further resize the one or more icons and the corresponding video content proportionately as a result of a single movement of the cursor.

42. The apparatus of claim 40, wherein the one or more icons indicate a camera angle for viewing of the video content.

43. A recordable medium having instructions stored thereon, which when executed, implement a method comprising:
rendering video content within a windowpane displayed upon a graphical user interface (GUI), the rendered video content displayed in a proportional relation to the windowpane;
positioning a cursor to a location within the GUI responsive to a user input; and
upon positioning of said cursor within said windowpane, automatically superimposing a graphical resizing overlay over the windowpane to facilitate arbitrary resizing of the windowpane and corresponding video content by the user when the cursor is positioned within the windowpane such that the rendered video content remains in the relational proportion to the windowpane.

44. The recordable medium of claim 43, wherein the graphical resizing overlay facilitates arbitrary resizing of the video content while the video content maintains a constant aspect ratio.

45. The recordable medium of claim 43, wherein rendering comprises:
blackening the GUI entirely; and
rendering the video content so as to be centered upon the blackened GUI.

46. A recordable medium having instructions stored thereon, which when executed, implement a method comprising:
displaying an application window within a graphical user interface (GUI), the application window including at least a first windowpane and a second windowpane;
rendering video content within the first windowpane, the video content having a first display size that is in a proportional relation to the first windowpane;
upon positioning of a cursor within said first windowpane, automatically superimposing a graphical resizing overlay over said first windowpane;
resizing the first windowpane and the corresponding video content by a first amount via said graphical resizing overlay resulting in a second display size such that the rendered video content remains in the relational proportion to the first windowpane, the resizing based at least in part upon received user input; and
dynamically resizing the second windowpane by a second amount proportional to the first amount such that the video content remains unobstructed by the first and second windowpanes and the application window.

47. The recordable medium of claim 46, wherein the application window remains a constant size during the resizing of the first and second windowpanes.

48. The recordable medium of claim 46, wherein one of the first and second windowpanes is given priority over the remaining windowpane such that content displayed within the windowpane having the priority is resized so as to maintain a constant aspect ratio.

49. A recordable medium having instructions stored thereon, which when executed, implement a method comprising:
- displaying an application window within a graphical user interface (GUI), the application window including at least a first windowpane;
- rendering video content within the first windowpane, the video content having a first display size, the rendered video content in a relational proportion to the first windowpane;
- upon positioning of a cursor within said first windowpane, automatically superimposing a graphical resizing overlay over said first windowpane;
- providing one or more icons indicating information related to the video content within the first windowpane; and
- resizing the first windowpane, the one or more icons and the corresponding video content via the graphical resizing overlay by a first amount resulting in a second display size that remains in the proportional relation to the first windowpane, the resizing based at least in part upon received user input.

50. The recordable medium of claim 49 wherein resizing the first windowpane resizes the one or more icons and the corresponding video content proportionately as a result of a single movement of the cursor.

51. The recordable medium of claim 49, wherein the one or more icons indicate a camera angle for viewing of the video content.

* * * * *

UNITED STATES PATENT AND TRADEMARK OFFICE
CERTIFICATE OF CORRECTION

| | |
|---|---|
| PATENT NO. | : 7,549,127 B2 |
| APPLICATION NO. | : 10/211990 |
| DATED | : June 16, 2009 |
| INVENTOR(S) | : Jeffrey Martin Chasen, Kenneth B. Moore and Peter J. Bradley |

It is certified that error appears in the above-identified patent and that said Letters Patent is hereby corrected as shown below:

Column 3, line 29 "height (h.sub.i) of windowpane 110..." should be changed to --height (h.sub.1) of windowpane 110...--.

Column 4, line 57 through 58 "As those skilled in the art will also appreciate, from the description the follow....," should be changed to --As those skilled in the art will also appreciate, from the description that follows,...--.

Column 8, line 56 through 57 "Moreover, the width (w.sub.1) of windowpane 1110 decreased and amount proportional to the amount...," should be changed to --...windowpane 1110 decreased an amount proportional to the amount...--.

Signed and Sealed this

Twenty-fifth Day of August, 2009

David J. Kappos
*Director of the United States Patent and Trademark Office*